United States Patent
Fritze (10) Patent No.: US 6,360,764 B1
(45) Date of Patent: Mar. 26, 2002

(54) CARTRIDGE ADAPTER

(75) Inventor: Karl Fritze, Denmark Township, MN (US)

(73) Assignee: PentaPure Incorporated, Eagan, MN (US)

(*) Notice: Subject to any disclaimer, the term of this patent is extended or adjusted under 35 U.S.C. 154(b) by 0 days.

(21) Appl. No.: 09/618,912

(22) Filed: Jul. 18, 2000

(51) Int. Cl.$^7$ ................................................ B01D 27/08
(52) U.S. Cl. .................. 137/15.01; 137/544; 137/594; 210/234; 210/240
(58) Field of Search .............................. 210/234, 239, 210/240; 137/544, 594, 15.01

(56) References Cited

U.S. PATENT DOCUMENTS

| | | |
|---|---|---|
| 2,338,291 A | 1/1944 | McIntosh |
| 2,991,885 A | 7/1961 | Gutkowski |
| 3,529,515 A | 9/1970 | Lang |
| 3,914,176 A | 10/1975 | Holmes |
| 4,006,752 A | 2/1977 | De Vale |
| 4,396,512 A | 8/1983 | Beauman |
| 4,437,499 A | 3/1984 | Devale |
| 4,440,200 A | 4/1984 | DeVale |
| 4,529,514 A | 7/1985 | Gruett |
| 4,556,484 A | 12/1985 | Hunter |
| 4,594,361 A | 6/1986 | Beauman |
| 4,645,601 A | 2/1987 | Regunathan |
| 4,654,142 A | 3/1987 | Thomsen |
| 4,725,354 A | 2/1988 | Thomsen |
| 4,735,716 A | 4/1988 | Petrucci |
| 4,759,474 A | 7/1988 | Regunathan |
| 4,770,770 A | 9/1988 | Regunathan |
| 4,857,189 A | 8/1989 | Thomsen |
| 4,904,382 A * | 2/1990 | Thomsen |
| 4,956,086 A | 9/1990 | Thomsen |
| 5,049,269 A * | 9/1991 | Shah ........................ 210/234 |
| RE34,031 E | 8/1992 | Thomsen |
| RE34,050 E | 9/1992 | Thomsen |
| 5,527,470 A | 6/1996 | Suda |
| 5,548,227 A | 8/1996 | Regunathan |
| 5,653,871 A | 8/1997 | Thomsen |
| 5,705,067 A * | 1/1998 | Sumi et al. ............... 210/234 |
| 5,753,107 A * | 5/1998 | Magnusson et al. ...... 210/234 |
| 5,833,849 A | 11/1998 | Primdahl |
| 5,914,037 A * | 6/1999 | Yen ........................... 210/234 |

FOREIGN PATENT DOCUMENTS

| | | |
|---|---|---|
| DE | 1134659 | 8/1962 |
| JP | 60-14914 | 1/1985 |

* cited by examiner

*Primary Examiner*—Stephen M. Hepperle
(74) *Attorney, Agent, or Firm*—Patterson, Thuente, Skaar & Christensen, P.A.

(57) ABSTRACT

An adapter assembly for use in mating a filter cartridge to a filter manifold, includes an adapter body having a manifold coupler and a cartridge coupler. The manifold coupler is for mating with the filter manifold and has an inlet being fluidly communicable with a filter manifold fluid inlet and a fluid outlet being fluidly communicable with a filter manifold fluid outlet and having sealing means, the sealing means isolating an inlet flow of unfiltered water from an outlet flow of filtered water. The cartridge coupler is for mating with the filter cartridge and has an inlet being fluidly communicable with a filter cartridge inlet and being in fluid communication with the manifold coupler inlet and a fluid outlet being fluidly communicable with a filter cartridge outlet and being in fluid communication with the manifold coupler outlet and having sealing means, the sealing means isolating an inlet flow of unfiltered water to the filter cartridge from an outlet flow of filtered water form the filter cartridge. At least one valve is disposed in the adapter body to control the flow of water therethrough. A method for mating a filter cartridge to a filter manifold is also included.

26 Claims, 5 Drawing Sheets

Fig. 6

CARTRIDGE ADAPTER

TECHNICAL FIELD

The present invention relates to an adapter for adapting a filter cartridge to a manifold. More particularly, the present invention relates to an adapter for use with a manifold mounted on a major appliance, such as a refrigerator.

BACKGROUND OF THE INVENTION

Major appliances, most particularly refrigerators, are frequently supplied to the end user with a filtration manifold as an integral component of the appliance. This manifold, when mated to a filter cartridge, is used to filter incoming tap water, the filtered water then being used in an automatic ice maker or is made available at a chilled water spigot. The manifold is plumbed into the appliance and is fixedly coupled thereto by a bracket or their mounting means. The manifold is intended to not be replaced, but to remain a component of the appliance throughout the life of the appliance.

The manifold is typically designed to receive only a particular type of filtration cartridge. The filtration cartridge is typically replaced on a regular basis as the active elements of the cartridge and filter media become spent with use. The end user of the appliance must then procure a filtration cartridge that is designed to be specifically mated to the cartridge manifold that is a component of the appliance.

The particular cartridge that is designed to mate with the manifold may not be the best filtration cartridge on the market. The particular cartridge may be more expensive than competing cartridges. Further, the filtration technology of the particular cartridge may not have kept pace with the advances in filtration technology prevalent in the industry. Accordingly, for a variety of reasons, there is a need in the industry to be able to adapt a plurality of filtration cartridges to a specific manifold. An adapter to a possible use of a cartridge not specifically designed for mating with the manifold should be readily insertable in the manifold and thereafter be generally a permanent part of the manifold. The adapter should then be available to readily receive a filtration cartridge for which the adapter is designed. The adapter should permit the engagement and disengagement of the filtration cartridge so that replacement thereof is readily facilitated.

SUMMARY OF THE INVENTION

The adapter of the present invention substantially meets the aforementioned needs of the industry. The adapter is mateable with a specific filtration manifold and thereafter, effectively, becomes a component of the filtration manifold. The adapter is further mateable with a specific cartridge such that, for all intents and purposes, once the adapter is mated to the filtration manifold, the filtration manifold is modified to regularly accept filtration cartridges of a different design.

The adapter is designed to appropriately actuate any valves that may exist in the filtration manifold and additionally may include a valve or valves of its own. The adapter is further mated in sealing engagement with the manifold, acting to prevent intermingling of incoming unfiltered water and outgoing filtered water. The adapter is further in sealing engagement with the filtration cartridge, again acting to isolate the incoming unfiltered water from the outgoing filtered water.

The adapter is readily disengageable from the filtration manifold, but is designed to be engaged with the filtration manifold and remain in such disposition for substantial lengths of time. Once in place, the adapter effectively modifies the filtration manifold such that for the end user, the filtration manifold becomes a manifold that is designed to accept the filtration cartridge of choice.

The present invention is an adapter assembly for use in mating a filter cartridge to a filter manifold and includes an adapter body having a manifold coupler and a cartridge coupler. The manifold coupler is for mating with the filter manifold and has an inlet being fluidly communicable with a filter manifold fluid inlet and a fluid outlet being fluidly communicable with a filter manifold fluid outlet and having sealing means, the sealing means isolating an inlet flow of unfiltered water from an outlet flow of filtered water. The cartridge coupler is for mating with the filter cartridge and has an inlet being fluidly communicable with a filter cartridge inlet and being in fluid communication with the manifold coupler inlet and a fluid outlet being fluidly communicable with a filter cartridge outlet and being in fluid communication with the manifold coupler outlet and having sealing means, the sealing means isolating an inlet flow of unfiltered water to the filter cartridge from an outlet flow of filtered water from the filter cartridge. At least one valve is disposed in the adapter body to control the flow of water therethrough. The present invention is further a method for mating a filter cartridge to a filter manifold.

DETAILED DESCRIPTION OF THE DRAWINGS

Figure 5:
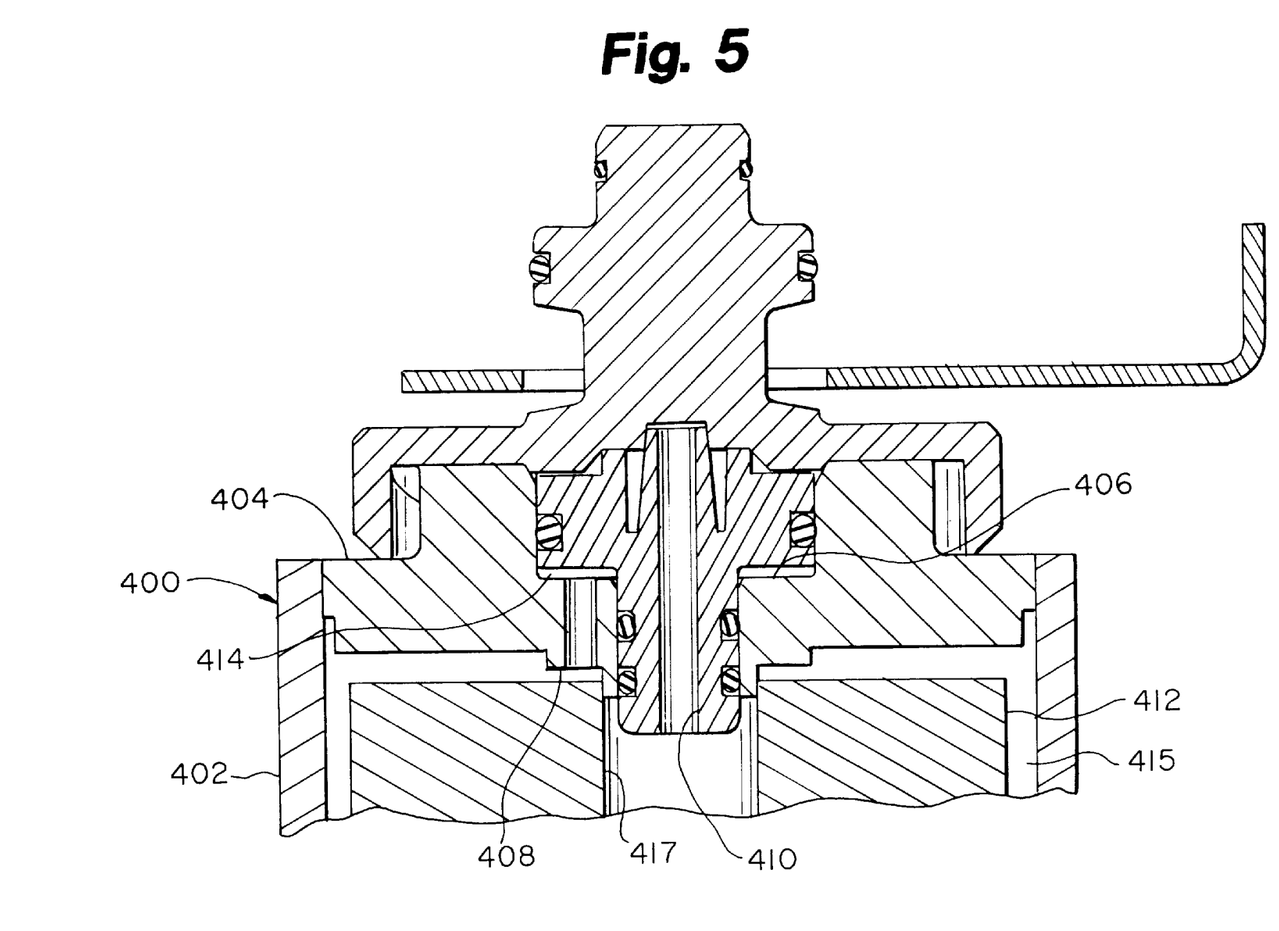
FIG. 5 is a sectional view of the adapter assembly disposed in a manifold and supporting a cartridge, the section being taken along the section line 3—3 of FIG. 1.
Figure 6:
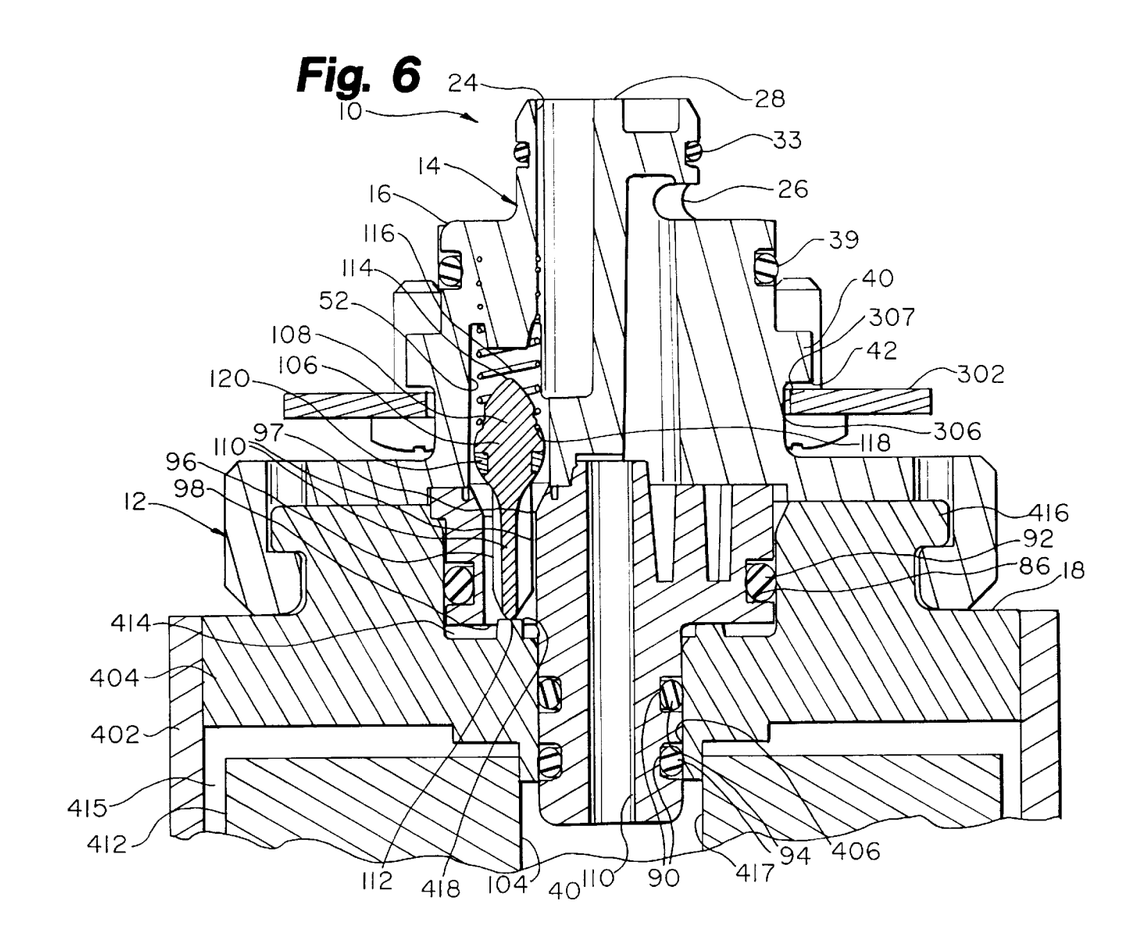
FIG. 6 is a sectional view of the adapter assembly disposed in a manifold and supporting a cartridge, the section being taken along the section line 2—2 of FIG. 1.

The adapter assembly of the present invention is shown generally at 10 in the figures. The adapter assembly 10 has two major subcomponents: adapter body 12 and cartridge insert 14. The adapter assembly 10 is designed to mate with a manifold 300 and a cartridge 400. The manifold 300 is depicted in FIGS. 2, 3, 5, and 6 and the cartridge 400 is depicted in FIGS. 5 and 6.

The manifold 300 has two major subcomponents: bracket 302 and cartridge receiver 304. The bracket 302 is preferably formed of a metallic material. Bracket 302 has a bore 306 defined therein for receiving the cartridge receiver 304 therein. An upper lip 307 is defined peripheral to the bore 306 and extends radially outward therefrom. The bracket 302 has an upward directed support 308. The support 308 may have bores defined therein through which fasteners, such as sheet metal screws and bolts may be passed for fastening the manifold 300 to an appliance.

The second subcomponent of the manifold 300 is the cartridge receiver 304. The cartridge receiver 304 is preferably formed of a plastic material. The cartridge receiver 304 preferably has a receiver chamber 310 defined therein. An inlet 312 is fluidly coupled to the receiver chamber 310. The inlet 312 has an inlet valve 314 disposed therein. The inlet valve 314 is biased in a closed disposition sealing off the inlet 312 when no cartridge or adapter assembly 10 is disposed within the receiver chamber 310 in order to prevent the flow of incoming unfiltered water therethrough. The inlet valve 314 has a depending valve actuator 316. The distal end of the valve actuator 316 is valve actuator margin 318. When a cartridge which is specifically designed to mate with the manifold 300 or the adapter assembly 10 of the present invention is disposed within the receiver chamber 310, the valve actuator margin 318 bears on the adapter assembly 10 (or the cartridge) and the inlet valve 314 is opened to permit flow from the inlet 312 to the inlet chamber 320. The inlet chamber 320 is defined in part by the cartridge receiver 304 and comprises a portion of the receiver chamber 310.

The cartridge receiver 304 further has an outlet 321. The outlet 321 is in fluid communication with an outlet chamber 322. The outlet chamber 322 is defined in part by the receiver chamber 310.

Referring to FIGS. 5 and 6, the cartridge 400 has a cylindrical cartridge body 402. The cartridge body 402 is substantially closed to define an interior filtration chamber by a generally circular top member 404 disposed within the body 402. It is understood that the top member 404 may be welded or bonded in place or may be formed integral with the cartridge body 402.

The top member 404 of the cartridge 400 has an insert receiver 406 defined therein. An inlet 408 is defined through the top member 404. The inlet 408 is offset from the center axis of the top member 404. It is understood that a plurality of such inlets 408 may be defined in the top member 404. An axial outlet 410 is defined in the top member 404.

The preferably cylindrically shaped filter media 412 is disposed in the filtration chamber defined within the body 402. Unfiltered water flows into the inlet chamber 414 through the inlet 408 across the top of the filter media 412 and into the ambular chamber 415 defined between the filter media 412 and the body 402. The unfiltered water then passes through the filter media 412 into the axial passage 417 defined central to the filter media 412 and then out the outlet 410.

Referring to FIG. 6, the cartridge 400 includes a pair of spaced apart shoulders 416. The shoulders 416 are preferably arcuate in shape (but may be other designs as desired) and are designed to be engaged by a manifold or, in this case, by the adapter assembly 10.

Turning now to this description of the adapter assembly 10 of the present invention, the adapter assembly 10 is preferably formed having two major components: adapter body 12 and cartridge insert 14. While the adapter assembly 10 could be formed as an integral, unitary device, forming the adapter assembly 10 of an adapter body 12 and cartridge insert 14 and subsequently mating the components 12, 14 facilitates the formation process of the adapter assembly 10.

The adapter body 12 of the adapter assembly 10 has two major subcomponents: manifold insert 16 and cartridge receiver 18. The manifold insert 16 of the adapter body 12 has a cupola 20 disposed on a base 22. Generally, the cupola 20 has a substantially lesser diameter than the diameter of the base 22. A descending inlet 24 is defined in the top margin of the cupola 20. The inlet 24 is generally semicircular on one side and straight on a second side. The second (straight) side of the inlet 24 is defined by a septum 28 that extends diametrically across the top margin of the cupola 20.

An outlet 26 is defined in the side margin 30 of the cupola 20. An O-ring groove 32 is defined in the side margin 30 of the cupola 20 above the outlet 26 and below the inlet 24. An O-ring 33 is disposable within the O-ring groove 32 to provide a fluid seal between the inlet 24 and the outlet 26.

The base 22 of the manifold insert 16 has a generally planar top margin 34 extending radially outward from the cupola 20. The base 22 has a generally cylindrical side margin 36. It should be noted that no inlets or outlets are defined in either the planar top margin 34 or the cylindrical side margin 36 of the base 22. An O-ring groove 38 is defined in the cylindrical side margin 36 and an O-ring 39 is disposable within the O-ring groove 38.

A pair of generally diametrically opposed shoulders 40 project outward from the cylindrical side margin 36. The underside of each of the shoulders 40 is a bearing surface 42. An engaging ramp 44 extends to the bearing surface 42 at a first end thereof and disengaging ramp 46 extends to the bearing surface 42 at a second end thereof. A pair of diametrically opposed flats 48 are defined in the side margin 36 of the base 22.

Figure 3:
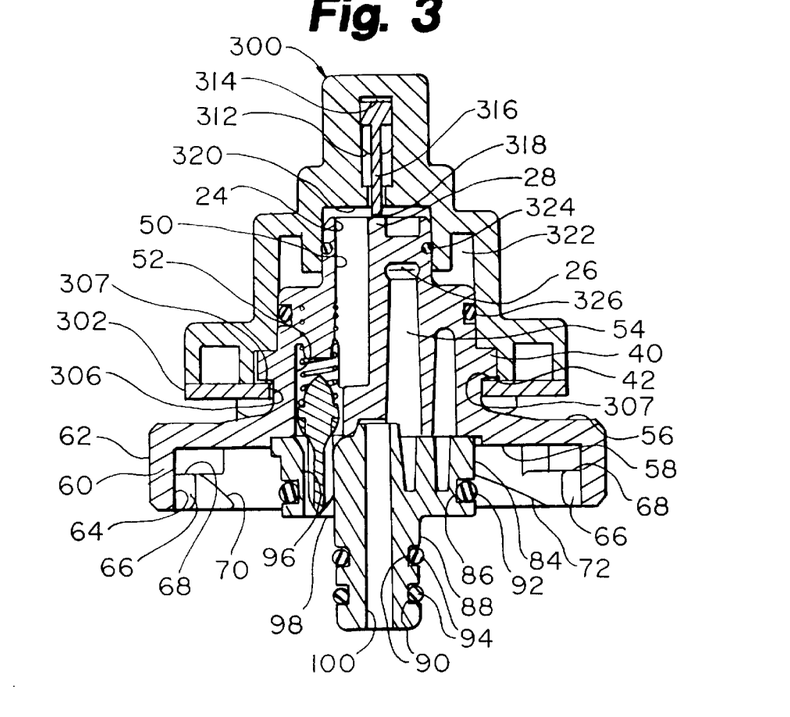
FIG. 3 is a sectional view of the adapter assembly disposed in an exemplary manifold, the section being taken along the line 3—3 of FIG. 1.

Referring to FIG. 3, descending inlet passage 50 extends downward from the inlet 24 and is in fluid communication with a valve well 52. The valve well 52 is fluidly open at the underside of the base 22. An ascending outlet passage 54 is defined in the base 22 adjacent to but separated from the descending inlet passage 50. The ascending outlet passage 54 is in fluid communication with the outlet 26.

The cartridge receiver 18 extends radially outward from the lower margin of the base 22. The cartridge receiver 18 has substantially greater diameter than the base 22. The cartridge receiver 18 has a substantially planar upper margin 56. A plurality of cutouts 57 may be defined through the cartridge receiver 18 proximate the peripheral margin thereof.

Figure 4:
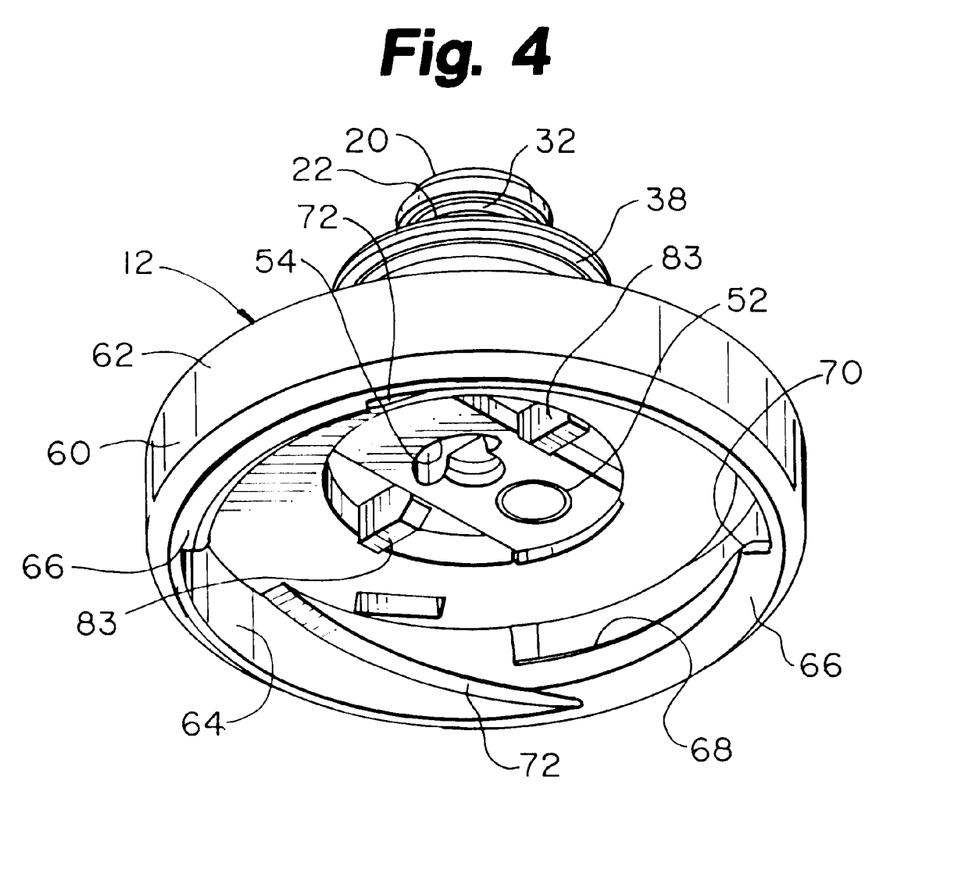
FIG. 4 is a perspective view of the adapter body of the adapter assembly.

The peripheral margin of the cartridge receiver 18 is defined by a depending rim 60. The rim 60 has a rim outer margin 62 and a rim inner margin 64. The rim inner margin 64 is best depicted in FIG. 4. The rim inner margin 64 has a pair of diametrically opposed inwardly directed lugs 66. Each of the lugs 66 has an upper margin surface, as depicted in FIG. 4, that comprises a lug bearing surface 68. The lugs 66 each have a lug engaging ramp 70 defined at a first end of the respective lug 66. As will be seen, the cartridge 400 is rotatably mated to the adapter assembly 10 by first engaging the ramp 70 with the shoulder 416 and then riding on the ramp 70 to draw the cartridge 400 into the adapter assembly 10 and to engage the lug bearing surface 68.

A pair of diametrically opposed lug disengaging kickoff ramps 72 are disposed at the opposite second end of the respective lug 66 from the lug engaging ramp 70. The kickoff ramps 72 extend downward to fair into the bottom margin of the respective lug 66. As will be seen, the kickoff ramps 72 provide for a gradual disengagement of the cartridge 400 from the adapter assembly 10. The use of the kickoff ramps 72 permits the user that is removing a cartridge 400 to gradually and smoothly overcome the sealing friction that exists as a result of the o-ring seals 92, 94, described in detail below, so that the cartridge 400 is removed without a jerking motion as is otherwise felt when the sealing friction is released suddenly.

The cartridge insert 14 is the second major subcomponent of the adapter assembly 10. The cartridge insert 14 is preferably fixedly coupled to the adapter body 12 as by welding, bonding or the like. In order to seat the cartridge insert 14 on the adapter body 12 prior to welding, the upwardly directed couplers 82 of the body 80 of the cartridge insert 14 are engaged with the radial walls 83 of the adapter body 12.

The body 80 of the cartridge insert 14 has a first expanded body portion 84 that presents a generally cylindrical outer margin 85. The outer margin 85 has an O-ring groove 86 defined therein.

A second reduced body portion 88 depends from the expanded body portion 84. The reduced body portion 88 presents a substantially cylindrical outer margin 89. The outer margin 89 has a significantly reduced diameter when compared to the diameter of the expanded body portion 84. Two O-ring grooves 90 are defined in the outer margin 89. An O-ring 92 may be disposed in the O-ring groove 86 and an O-ring 94 may be disposed in each respective 0-ring groove 90.

Referring to FIG. 3, the cartridge insert 14 has a valve receiver 96 defined therein. The valve receiver 96 is fluidly coupled to the valve well 52. The valve receiver 96 terminates in an inlet discharge 98 that is in fluid communication with the inlet chamber 414 defined in cooperation with the cartridge 400. An axial outlet passage 100 is defined through the cartridge insert 14.

Figure 1:
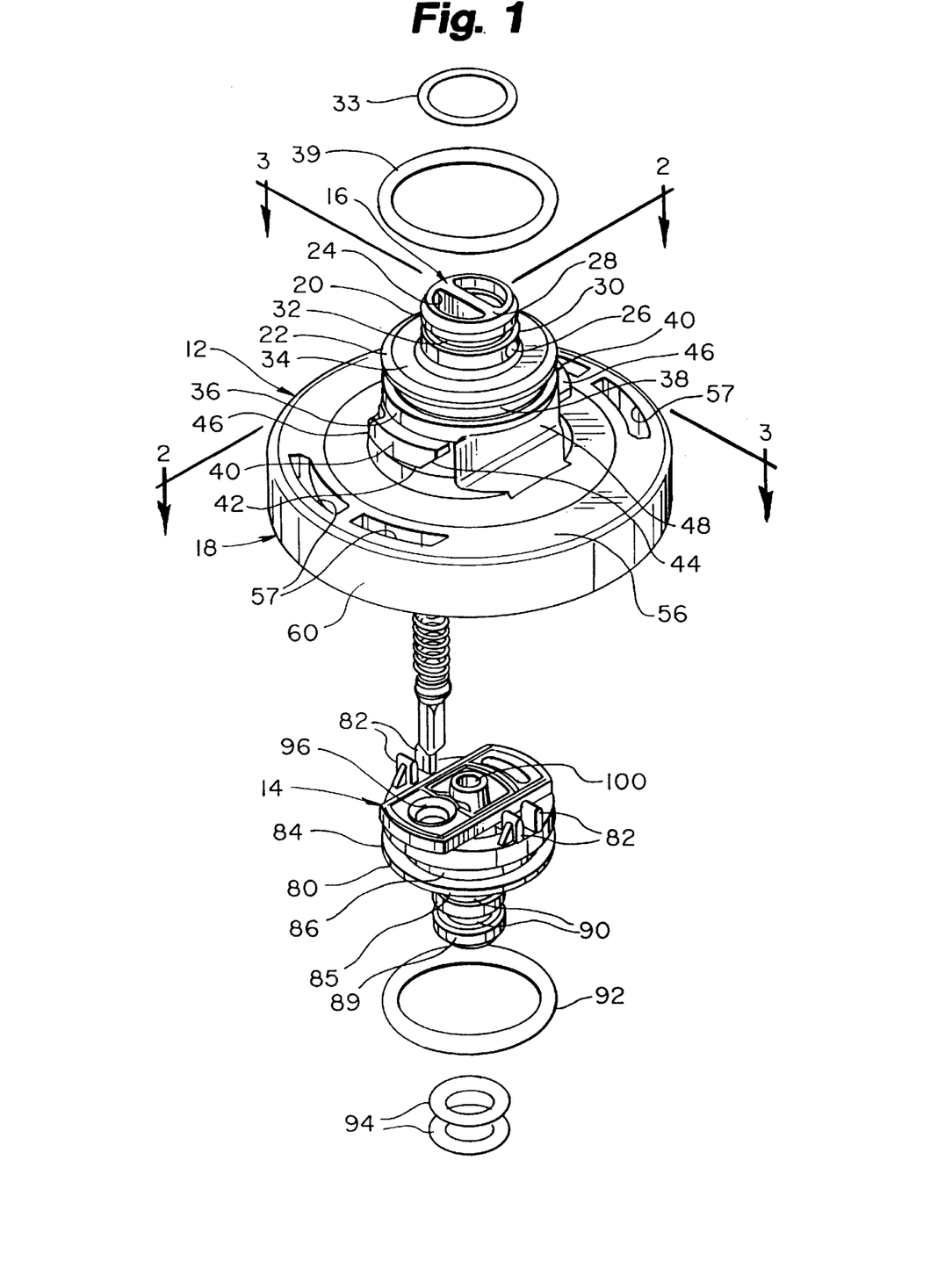
FIG. 1 is an exploded perspective view of the adapter assembly of the present invention.
Figure 2:
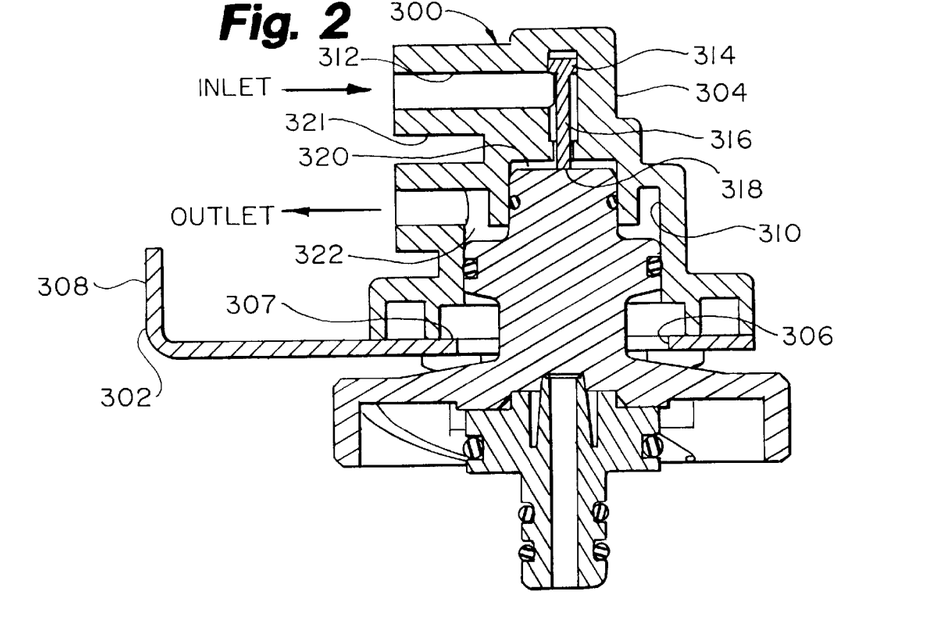
FIG. 2 is a sectional view of the adapter assembly disposed in an exemplary manifold, the section being taken along the line 2—2 of FIG. 1.

A high flow valve 102 is translatably disposed in the valve well 52 and the valve receiver 96. Details of the construction of the high flow valve 102 may be had with reference to FIGS. 1, 3, and 6. The high flow valve 102 has an efficient hydrodynamic shape to ensure a high rate of flow when the valve 102 is in the open disposition, as depicted in FIGS. 3 and 6. Further, as will be seen, the fluted shaft 104 of the high flow valve 102 ensures both a high rate of flow thereby and further acts to maintain the axial alignment of the high flow valve 90 with respect to the valve receiver 96.

The high flow valve 102 has a valve body 106. The valve body 106 has a head 108 tapering to the fluted shaft 104. In a preferred embodiment, the flutes of the fluted shaft 104 are defined between four equal angularly spaced flute walls 110. In practice, one of the flute walls 110 may be thicker than the others in order to assist in mold ejection. A bearing surface 112 is defined at the distal end of the fluted shaft 104. A tip 114 is disposed at the opposite end of the high flow valve 102 from the bearing surface 112.

A coil spring 116 is disposed in the valve well 52 and engages the head 108 of the valve 102 to bias the valve 102 in the closed, seated disposition. Several coils of the spring 96 preferably spiral around the head 108 of the high flow valve 102. The first coil of the spring 116 is retained within a spring retainer groove 118 defined circumferential to the head 108. A circumferential seal 120 is disposed around the waist of the head 108. In a preferred embodiment, the seal 120 is integrally molded by an injection over molding of thermal plastic rubber material subsequent to formation of the body of the high flow valve 102 and eliminates the need to use an O-ring in conjunction with the valve 102.

The exterior shape of the seal 120 continues the curved shape of the head 108 and contributes to the hydrodynamic efficiency of the high flow valve 102. In the past, the use of an O-ring seal provided a substantial impediment to the flow of water around the valve. By forming the valve 102 of a material that is not affected by the type of plastic welding used to weld the cartridge insert 14 to the adapter body 12, the valve 102 may reside in the well 52 and valve receiver 96 during welding without being affected by the welding operation. For example, the valve 102 may be formed of polypropylene and the adapter body 12 may be formed of ABS in the event that sonic welding is used.

In operation, the manifold insert 16 of the adapter assembly 10 is inserted through the bore 306 defined in the bracket 302 of the manifold 300 and into the receiver chamber 310 defined in the cartridge receiver 304. The adapter assembly 10 is then rotated clockwise approximately one-quarter of a turn. This rotation brings the engaging ramp 44 of the shoulders 40 of the manifold insert 16 into engagement with the upper lip 307 defined peripheral to the bore 306. The rotary motion causes the manifold insert 16 to ride upward into the receiver chamber 310 to a position where the bearing surface 42 of the shoulders 40 is in compressive engagement with the lip 307.

Such upward motion causes the septum 28 on the top margin of cupola 20 of the manifold insert 16 to bear on the valve actuator margin 318 of the cartridge receiver 304. The upward motion of the manifold insert 16 acts to open the inlet valve 314. When the inlet valve 314 is opened, untreated water is free to flow in the inlet 312 and down through the descending inlet passage 50 of the manifold insert 16. Such flow is arrested by the valve 102 being biased in the closed, sealed disposition by the spring 116.

To disengage the adapter assembly 10 from the manifold 300, an opposite rotary motion is imparted to the adapter assembly 10. Such motion causes the disengaging ramp 46 of the shoulder 40 to engage a tab formed internal to the bore 306 of the manifold 300. Such engagement causes the bearing surface 42 to disengage from the upper lip 307 and the adapter assembly 10 may be withdrawn from the receiver chamber 310 by pulling down slightly on the adapter assembly 10. Such downward motion causes the septum 28 to disengage from the valve actuator margin 318 and the inlet valve 314 is then biased into the closed disposition sealing off the inlet 312.

When the adapter assembly 10 is engaged within the manifold 300 as indicated above, the adapter assembly 10 is ready to receive the cartridge 400. The cartridge 400 is slid upward to dispose the insert receiver 406 in a substantially encompassing relationship with the cartridge insert 14 of the adapter assembly 10. Such motion brings the cartridge insert receiver 406 into sealing engagement with the O-rings 86, 94. Further, the inlet chamber 414 is cooperatively defined between the insert receiver 406 and the cartridge insert 14.

After engagement of the insert receiver 406 with the cartridge insert 14, the cartridge 400 is rotated to engage the shoulders 416 with the lugs 66 of the cartridge receiver 18. The shoulders 416 ride up the lug engaging ramp 70 defined at an end of the respective lugs 66 until the lug bearing surface 68 is in compressive engagement with the shoulder 416. Such motion causes the cartridge 400 to bear on the bearing surface 112 of the valve 102, thereby unseating and opening the valve 102, as described below.

Removal of a cartridge 400 from the adapter assembly 10 is by opposite rotation of the cartridge 400 and a downward withdrawal motion. Such rotation causes the shoulder 416 of the cartridge 400 to engage the lug disengaging kickoff ramp 72 of the lug 66 that is disposed opposite the lug 66 with which the respective shoulder 416 is engaged. Such rotational motion causes the shoulder 416 to ride downward on the lug disengaging kickoff ramp 72 to slowly disengage the insert receiver 406 from sealing engagement with the O-rings 86, 94. Such motion causes the cartridge 40 to disengage from the bearing surface 112 of the valve 102. The spring 116 then biases the valve 102 in the seated, closed disposition as described below.

In operation, the head 108 and the spring 116 of the high flow valve 102 reside within the valve well 52. The fluted shaft 104 of the high flow valve 102 resides in the valve receiver 96 defined in the cartridge receiver 18 (see FIGS. 1, 3, and 6). The valve receiver 96 has seat 97 defined therein. In the closed disposition of the high flow valve 102, the seal 120 bears on the seat 97 under the biasing effect of the spring 116 in cooperation with the pressure exerted by the incoming water to be filtered. In the closed disposition, the high flow valve 102 prevents the flow of unfiltered water through the adapter assembly 10.

When a cartridge 400 is rotatably engaged with the adapter assembly 10, the bearing surface 112 is acted on by the actuating surface 418 to force the high flow valve 102 upward as depicted in FIGS. 3 and 6. Such translation of the high flow valve 102 causes the seal 120 to unseat from the seat 97. The unseating of the high flow valve 102 causes the incoming water that is to be filtered to flow around the head 108 and through the flutes defined by the flute walls 110. The outer margin of the flute walls 110 have a dimension measured diametrically from flute wall 110 to the opposed flute wall 110 that is only slightly less than the inside diameter of the valve receiver 96. Accordingly, the exterior margin of the flute walls 110 can bear on the wall of the valve receiver 96 to maintain very close axial alignment of the high flow valve 102 with the longitudinal axis of the valve receiver 96. Such alignment ensures that the bearing surface 112 is adequately engaged by the actuating surface 418 to open the high flow valve 102 and to maintain the valve 102 in an aligned open disposition. It should be noted that at all times when the cartridge 400 is rotatably engaged with the adapter assembly 10, the high flow valve 102 is maintained in an open disposition. It should also be noted that a valve could additionally be disposed in the ascending outlet passage 54 for control of the flow of filtered water as desired.

It will be obvious to those skilled in the art that other embodiments in addition to the ones described herein are indicated to be within the scope and breadth of the present application. Accordingly, the applicant intends to be limited only by the claims appended hereto.

What is claimed is:

1. An adapter assembly for use in mating a filter cartridge to a filter manifold, comprising:
    an adapter body having a manifold coupler and a cartridge coupler;
    the manifold coupler for mating with the filter manifold and having a manifold coupler inlet being fluidly communicable with a filter manifold fluid inlet and a fluid outlet and further being fluidly communicable with a filter manifold fluid outlet and having sealing means, the sealing means isolating an inlet flow of unfiltered water from an outlet flow of filtered water;
    the cartridge coupler for mating with the filter cartridge and having a cartridge coupler fluid inlet, said inlet being fluidly communicable with a filter cartridge inlet and being in fluid communication with the manifold coupler inlet and having a cartridge coupler fluid outlet, said outlet being fluidly communicable with a filter cartridge outlet and being in fluid communication with the manifold coupler outlet and further having sealing means, the sealing means isolating an inlet flow of unfiltered water to the filter cartridge from an outlet flow of filtered water form the filter cartridge; and
    at least one adapter assembly valve being disposed in the adapter body to control a flow of water therethrough.

2. The adapter assembly of claim 1 further including at least a first pair of shoulders for compressive, retaining engagement with the filter manifold.

3. The adapter assembly of claim 2 further including at least a first pair of lugs for compressive, retaining engagement with the filter cartridge.

4. The adapter assembly of claim 1 wherein the at least one adapter assembly valve is biased in a closed, seated disposition.

5. The adapter assembly of claim 4 wherein the at least one adapter assembly valve has a fluted shaft, a plurality of flutes defined by the fluted shaft comprising a plurality of flow passages.

6. The adapter assembly of claim 5 wherein the at least one adapter assembly valve has an integral seal.

7. The adapter assembly of claim 6 wherein the at least one adapter assembly valve integral seal is formed by overmolding on a valve body.

8. The adapter assembly of claim 4 wherein mating the manifold coupler to the filter cartridge acts to open the at least one adapter assembly valve.

9. The adapter assembly of claim 1 wherein mating the manifold coupler to the filter manifold acts to open a valve disposed in the filter manifold.

10. The adapter assembly of claim 9 wherein the adapter body includes a margin, the margin bearing on the filter manifold valve during mating the manifold coupler to the filter manifold and thereby acting to open the filter manifold valve.

11. A method of mating a filter cartridge to a filter manifold comprising:
    providing an adapter assembly;
    mating an adapter assembly manifold coupler with a cooperative filter manifold coupler;
    mating an adapter assembly cartridge coupler with a cooperative cartridge coupler; and
    establishing fluid communication between the filter manifold to the filter cartridge via the adapter assembly.

12. The method of claim 11 including controlling a flow from the filter manifold to the adapter assembly by means of an adapter assembly actuator being in actuating engagement with a valve disposed in the filter manifold.

13. The method of claim 11 including controlling a flow from the adapter assembly to the filter cartridge by means of at least one valve being disposed in the adapter assembly actuator.

14. The method of claim 13 including actuating the at least one valve being disposed in the adapter assembly by means of mating the filter cartridge to the adapter assembly.

15. The method of claim 14 including sealing the at least one valve disposed in the adapter assembly by means of an integral seal formed on a valve body.

16. The method of claim 15 including overmolding the integral seal on the valve body.

17. An adapter assembly for use in mating a filter cartridge to a filter manifold, comprising:
    adapter body means for mating the filter cartridge to the filter manifold, the adapter body means having manifold coupler means and cartridge coupler means;
    the manifold coupler means for mating with the filter manifold and having a manifold coupler inlet, said inlet being fluidly communicable with a filter manifold fluid inlet and a fluid outlet being fluidly communicable with a filter manifold fluid outlet and further having sealing means, the sealing means for isolating an inlet flow of unfiltered water from an outlet flow of filtered water;
    the cartridge coupler means for mating with the filter cartridge and having a cartridge coupler fluid inlet, said inlet being fluidly communicable with a filter cartridge inlet and being in fluid communication with the manifold coupler inlet and a cartridge coupler fluid outlet, said fluid outlet being fluidly communicable with a filter cartridge outlet and being in fluid communication with the manifold coupler outlet and further having sealing means, the sealing means isolating an inlet flow of unfiltered water to the filter cartridge from an outlet flow of filtered water from the filter cartridge; and at least one adapter assembly valve means being disposed in the adapter body for controlling a flow of water therethrough.

18. The adapter assembly of claim 17 further including at least a first pair of shoulders for compressive, retaining engagement with the filter manifold.

19. The adapter assembly of claim 18 further including at least a first pair of lugs for compressive, retaining engagement with the filter cartridge.

20. The adapter assembly of claim 17 wherein the at least one adapter assembly valve means is biased in a closed, sealed disposition.

21. The adapter assembly of claim 20 wherein the at least one adapter assembly valve means has a fluted shaft, a plurality of flutes defined by the fluted shaft comprising a plurality of flow passages.

22. The adapter assembly of claim 21 wherein the at least one adapter assembly valve means has integral seal means.

23. The adapter assembly of claim 22 wherein the at least one adapter assembly valve means integral seal means is formed by overmolding on a valve body.

24. The adapter assembly of claim 17 wherein mating the manifold coupler means to the filter cartridge acts to open the at least one adapter assembly valve means.

25. The adapter assembly of claim 17 wherein mating the manifold coupler means to the filter manifold acts to open a valve disposed in the filter manifold.

26. The adapter assembly of claim 25 wherein the adapter body means includes a margin, the margin bearing on the filter manifold valve during mating the manifold coupler means to the filter manifold and thereby acting to open the filter manifold valve.

* * * * *

UNITED STATES PATENT AND TRADEMARK OFFICE
CERTIFICATE OF CORRECTION

PATENT NO. : 6,360,764 B1
DATED : March 26, 2002
INVENTOR(S) : Fritze

It is certified that error appears in the above-identified patent and that said Letters Patent is hereby corrected as shown below:

<u>Title page,</u>
ABSTRACT,
Line 18, delete "form" and insert -- from --.

<u>Column 1,</u>
Line 18, delete "their" and insert -- other --.

<u>Column 4,</u>
Line 59, delete "o-ring" and insert -- O-ring --.

<u>Column 5,</u>
Line 15, delete "0-ring" and insert -- O-ring --.

<u>Column 7,</u>
Line 62, delete "form" and insert -- from --.

Signed and Sealed this

Twenty-sixth Day of November, 2002

*Attest:*

JAMES E. ROGAN
*Attesting Officer*       *Director of the United States Patent and Trademark Office*